US010019846B1

(12) United States Patent
York

(10) Patent No.: US 10,019,846 B1
(45) Date of Patent: Jul. 10, 2018

(54) SYSTEM AND METHOD FOR DELIVERING PROGRESSIVE AUGMENTED REALITY USING A SERIES OF RELATED MEDIA

(71) Applicant: Christina York, Ann Arbor, MI (US)

(72) Inventor: Christina York, Ann Arbor, MI (US)

(73) Assignee: ALTALITY LLC, Ann Arbor, MI (US)

( * ) Notice: Subject to any disclaimer, the term of this patent is extended or adjusted under 35 U.S.C. 154(b) by 28 days.

(21) Appl. No.: 15/442,583

(22) Filed: Feb. 24, 2017

(51) Int. Cl.
*G06T 19/00* (2011.01)
*G06T 15/00* (2011.01)

(52) U.S. Cl.
CPC .......... *G06T 19/006* (2013.01); *G06T 15/005* (2013.01); *G06T 2200/04* (2013.01); *G06T 2200/28* (2013.01)

(58) Field of Classification Search
CPC .......... G06K 9/00664–9/00704; G06F 3/0481; G06F 3/04817; G06F 9/4443; G06F 3/04847; G06F 11/3664; G06F 3/011; G06F 3/012; G06F 3/0304; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

2012/0176516 A1* 7/2012 Elmekies ................ G06F 3/011
348/239
2016/0271487 A1* 9/2016 Crouse ..................... A63F 1/00

* cited by examiner

*Primary Examiner* — Todd Buttram
(74) *Attorney, Agent, or Firm* — Thomas P. Heed; Heed Law Group

(57) ABSTRACT

An augmented reality system that provides multi-media presentations super-imposed on and presented with a series of augmented-reality enabled ("ARE") tokens. An user electronic appliance, possessing a display screen, a camera, and a software application, takes an image of an ARE token. A unique visual identifier is associated with each ARE token. A multi-media presentation, including a video component, an audio component, and, optionally, a haptic component, is associated with unique visual identifier. When the software application detects an ARE token, it creates the unique visual identifier and transmits it to a remote server and database. The remote server and database transmits the multi-media presentation, in return. The user electronic appliance plays and presents the multi-media presentation. The multi-media presentation associated with each ARE token in a series can interact and interoperate with the multi-media presentation associated with each of the other ARE tokens in the series.

36 Claims, 13 Drawing Sheets

US 10,019,846 B1

SYSTEM AND METHOD FOR DELIVERING PROGRESSIVE AUGMENTED REALITY USING A SERIES OF RELATED MEDIA

CLAIM OF PRIORITY

This U.S. utility patent application claims priority to U.S. utility patent application Ser. No. 14/991,755, filed Jan. 8, 2016; and U.S. provisional application No. 62/101,967, filed Jan. 9, 2015.

FIELD OF INVENTION

This invention relates to the class of computer graphics processing and selective visual display systems. Specifically, this invention relates to augmented reality systems applied to a series of interacting and interoperating tokens or cards.

BACKGROUND OF INVENTION

Children with life-threatening diseases often must undergo painful procedures. Procedures are invasive medical treatments and can be broadly categorized as mildly invasive, moderately invasive, or significantly/severely invasive. A mildly invasive procedure may cause some pain or discomfort, but it is usually limited in intensity and duration. Examples of mildly invasive procedures include, but are not limited to, shots and blood draws. Moderately invasive procedures can cause significant pain or discomfort and may require sedation in order to be performed. Examples of moderately invasive procedures include, but are not limited to, stitches and endoscopic procedures. Significantly or severely invasive procedures cause significant pain, both during the procedure, and during a post-operative convalescence period, and require sedation. Examples of severely invasive procedures include, but are not limited to, surgical procedures. Children are often stressed not only by the procedures, but by the anticipation of the procedure. Even receiving a shot or IV in preparation for a moderately or severely invasive procedure can cause stress for a child.

Additionally, there are many non-invasive procedures that impact children to a much greater degree than adults. For example, children are often scared or stressed by non-invasive diagnostic procedures, including, but not limited to, magnetic resonance imaging ("MRI"), computer-aided tomography ("CAT") scans, x-rays, electro-kardio grams ("EKG"). Children can also act adversely to chemotherapy. The side-effects of chemotherapy have undue impact on children because of the visible changes, such as loss of hair.

Due to the increase in children receiving medical procedures, many medical providers are trying to develop best-practices with regards to such treatment of children. Information about procedure pain in children is growing as there is increased interest and awareness among health care providers. It is important to think about pain control before the procedure begins, not after a child has become increasingly fearful and difficult to calm.

Research shows that managing both the anxiety of anticipating a procedure as well as the pain caused by the procedure itself is the best way to keep pain and anxiety under control. Solutions are often simple. A parent or trusted adult should remain with the child whenever possible. The child should have something that can reasonably distract them, refocusing their attention away from the procedure. A recent addition to the amelioration of pain and anxiety among children during medical procedures has been the use of some sort of token or memento to memorialize the procedures experienced by the child. Journey beads or tokens are especially popular during treatment of children that require serial procedures, such as chemotherapy, or other diseases in which the child undergoes procedures and diagnostics on a recurrent basis. A patient-child is given a new bead or token for each procedure or diagnostic, allowing the patient-child to acquire a collection of such beads or tokens. Such a collection can give the child comfort. The collection allows the child to feel esteem for their accomplishment, and it gives the child a physical manifestation to represent their progress.

Augmented reality offers a convenient way to reduce the anxiety and discomfort experienced by children in two ways. First, augmented reality can be used to distract children during a procedure. Second, augmented-reality-enabled ("ARE") tokens can be serialized in order to memorialize a child's progress through serialized therapeutic procedures and diagnostics. For example, when a child has a series of blood draws or chemotherapy treatments for leukemia, the child can receive an ARE token for each individual procedure. Ideally, such a system would provide enhanced augmented reality with each ARE token the child acquires, allowing all of the child's ARE tokens to interoperate, thematically; and allowing for a non-linear improvement in the overall augmented reality presented to the child as the child acquires more ARE tokens.

Unfortunately, no such system currently exists. The limitations of current technology can be seen in that none of them are widely used in the serial medical treatment of children. This is an unserved market and problem, awaiting a solution.

PRIOR ART REVIEW

To truly meet the market demand, an augmented reality system should be based around a collectable series of ARE tokens, such as cards. The ARE tokens should interoperate, encouraging a child to keep and collect the series of ARE tokens. The augmented reality presentation presented to the child as a result of the ARE tokens should improve non-linearly as the child collects more ARE tokens. In other words, when a child collects incremental ARE tokens, the augmented reality presentation should add content at a rate greater than the incremental addition of the ARE tokens. There is substantial prior art in augmented reality, but seemingly almost none related directly to using augmented reality to create a collectable series of ARE tokens.

There is prior art related to using augmented reality with specifically designed books containing pre-determined fiducial marks. For example, U.S. Utility Pat. No. 9,286,724, by named inventors Lucas-Woodley, et al., entitled, "Augmented reality system," teaches a system including an augmented reality device and a specialty book, intended for use with the augmented reality device, wherein the specialty book contains a fiduciary marker. There are several additional applications that have electronic books which are augmented reality enabled, among them the following: U.S. Patent Application Publication No. 20130201185 (Sony electronic book); U.S. Patent Application Publication No. 20140002497 (Sony electronic book); and U.S. Patent Application Publication 20140210710 (Samsung electronic book).

There is prior art related to identifying virtual objects suitable for use in augmented reality. For example, U.S. Utility Patent Application Publication No. 20160086381, by named inventors Jung, et. al, entitled, "Method for Providing Virtual Object and Electronic Device Therefor," teaches looking in database for virtual objects which meet a present set of conditions communicated from the user's electronic device. If none of the objects meet all of the present conditions, finding most-appropriate virtual object.

There is prior art related to constructing queries related to digital images captured by a camera within an augmented reality system. For example, U.S. Utility Patent Application Publication No. 20150317836, by named inventors Beaurepaire, et. al, entitled, "Method and Apparatus for Contextual Query Based on Visual Elements and User Input in Augmented Reality at a Device," teaches a method that receives at least one input specifying content information, wherein the input is received via at least one user interface presenting image data, and the method processes the data image to construct at least one query.

There is prior art related to identifying a target media for use in an augmented reality system, without the target having a specific fiducial mark. In addition to U.S. Utility patent application Ser. No. 14/991,755, published at Publication No. 20160203645, from which this application is a continuation-in-part, there is, for example, U.S. Utility Patent Application Publication No. 20150228123, by named inventor Yasutake, entitled, "Hybrid Method to Identify AR Target Images in Augmented Reality Applications," teaches a method for detecting an augmented reality (AR) target image and retrieving AR content for the detected AR target image, based on the data of the AR target image, a plurality of markers on the AR target image; and a set of cross ratios calculated from the markers.

There is prior art related to interacting with augmented reality or virtual reality objects. For example, U.S. Utility Patent Application Publication No. 20150177518, by named inventors Wong, et. al., entitled, "Methods and Devices for Rendering Interactions Between Virtual and Physical Objects on a Substantially Transparent Display," teaches a method and device for having an AR virtual object, totem, or avatar interact with the wearer of the device, or with some other real-world object.

Some of the augmented reality prior art teaches methods for recalling content from an image/record library. For example, U.S. Patent Application Publication No. 20130093759, by named inventor Bailey, entitled, "Augmented Reality Display Apparatus And Related Methods Using Database Record Data," teaches a system and method that captures an image, sends the image to a database, identifies a record based on the image, supplies the record to the display, and superimposes the record on top of and/or with the image on a display device.

Although there is significant prior art related to augmented reality superimposed on top of a captured image, there is none that directs this technology towards using augmented reality in conjunction with a series of ARE tokens.

SUMMARY OF THE INVENTION

This summary is intended to illustrate and teach the present invention, and not limit its scope or application. The present invention is a series of collectable ARE tokens that are used with an augmented reality system. In the embodiment disclosed in this application, the ARE tokens are collectable cards. The ARE tokens can be used to distract a child undergoing an invasive medical procedure or an anxiety-inducing diagnostic procedure. The ARE tokens can also be used to memorialize the child's journey through a course of treatment requiring multiple medical procedures. The cards are serialized, so that a sequence of thematically similar cards are given to the child on different visits.

Each card is associated with a unique visual identifier; and each unique visual identifier is associated with unique multi-media augmented reality content. The user views the multi-media augmented reality content associated with a card by viewing the card using a resident software application on a user electronic appliance, such as a mobile phone, a tablet, augmented reality goggles, laptop computer, monitor and camera, or any other fixed or mobile electronics possessing a display, a camera, a processing unit, and a communications means. The user electronic appliance resident software application interacts with a remote source provider such as a database and server configuration. The augmented reality system stores the unique visual identifier, and the record containing the multi-media augmented reality content associated with the unique visual identifier, within a database. The multi-media augmented reality content associated with a particular card is transmitted to the user electronic appliance from the remote source provider using a communication means. The communication means is accomplished by a communication chain including one or more of the following: cellular phone, wi-fi, Bluetooth, internet, Wide-area Network ("WAN"), Local-area Network ("LAN"), Personal-area Network ("PAN"), gaming console, and/or entertainment system.

Each card in a series is associated with a unique visual identifier. A number of unique identifiable features, such as fiducials, pictures, graphics, shapes, objects within pictures or graphics, color(s), text indents, card numbers, text, text patterns, relative location of pairs of letters, and location of particular letters on a card are identified from the image. A unique visual identifier for each card is created from one or more of these unique identifiable features.

Other methods of associating cards with the associated multi-media augmented reality content database can be used, such as RFID, magnetic ink, magnetic strips, ultraviolet or infrared ink. For example, cards can be constructed containing RFID chips, allowing the application to read the RFID chip and associate the card with a record in augmented reality database.

The augmented reality is viewed on a user electronic appliance. The user electronic appliance needs to provide sufficient hardware resources for the resident end-user application.

Each card is associated with an augmented reality record. The augmented reality record contains, at a minimum, the image of the card, the unique visual identifier, and a multi-media augmented reality content. Stored multi-media augmented reality content can include, but is not limited to, video, animation, stop motion animation, pictures, graphics, sounds, images, and vibrations. The stored multi-media augmented reality content can be supplemented with images, characters, graphics, sound effects, and other media created by a user and stored in that user's library. The user can, also, make an avatar. The stored multi-media augmented reality content can be supplemented with the avatar, and the avatar can interact with the stored multi-media augmented reality content through a variety of interfaces, such as a touch screen, keyboard, device movement, mouse, and user motion (e.g., waving hands or feet). The avatar, and the multi-media augmented reality content, itself, can be triggered by sound, movement of the user, movement of the user electronic appliance, or other video, audio, or haptic means. The stored multi-media augmented reality content may also interact with the avatar without user interaction, allowing the user to be pulled into the augmented reality story. The augmented reality system stores prior user animations, avatars, and interactions, so that each use of a particular card proceeds from where the prior use ended. The user can also decide to start, anew, at any time.

The stored multi-media augmented reality content and supplemental user-content library and avatar can be rendered using either proprietary, purchased, or open source rendering solutions. Rendering for each card is performed by associating the unique visual identifier for each card with a stored multi-media presentation on the server. Upon the application, resident on the user electronic appliance, requesting a particular card, portions of the record, including the multi-media augmented reality content, can be transmitted, via the communication means, for quick loading. In order to speed loading of rendered multi-media, the application software can also use video layering, allowing each layer to launch independently. The multi-media logic can track whether certain layers have rendered, and are thus available for interaction by the user, or use by the stored multi-media augmented reality content. The rendering system can be created so that augmented reality starts before all of the layers are downloaded and rendered, thus speeding the user's interaction.

To speed loading, the application identifies such information as where the user started a prior session, where the user ended a prior session, what is the most viewed card by the user, and what is the most viewed card by other users. The information is used to prioritize the loading of certain cards. In this way, the system is ready for use while it is still downloading information from the remote server.

The library of digital assets related to augmented reality is very large. As a result, the information is transmitted using either lossy or lossless data compression techniques. With lossy compression techniques, the loss in fidelity will be acceptable for certain device sizes, such as cellphones. The tradeoff in such a case between a lossy compression technique and the speed of transmission and loading will be acceptable. When higher media fidelity is desired, loseless compression can be used.

During a session, all user created animation and media is stored, so that when the user goes back to a previous card, all of the graphics are there. Logic can be embedded within the augmented reality that allows it to extrapolate position and interaction of user created media on each new card. This allows user-created augmented-reality to be placed on a new card, ready for use upon the card being viewed with the user electronic appliance. At the end of a session, all of the user's interactions and all of the user-created media can be stored as input to the next user session with a particular card. With such a system, it does not matter if a user proceeds non-linearly through a session, as each card is stored independently, and the user-created media is interpolated and/or extrapolated onto each new card.

The augmented reality is implemented with use-context logic, so that certain media is provided, excluded or modified based on the use context detected. Use context can include random card flipping, shaking or moving the electronic device, user inaction, user hyper-action, etc.

A series of cards can interact with one another, offering supplemental augmented reality for the user and even altering the augmented reality associated with a combination of cards. Each combination of cards has a defined interaction, allowing interaction between the multi-media augmented reality content for each card, and supplementing that combined individual multi-media augmented reality content where appropriate. An additional multi-media augmented reality content record is stored for each combination of cards in a series of cards, enabling additional content as a user acquires more cards. The multi-media augmented reality content for a combination of cards interact with one another, creating unexpected outcomes for the users. By serializing the cards, and adding interactions as a child gets more cards, the present invention both distracts the user from the procedure and gives the patient a suitable memento to memorialize their progress.

The graphics associated with a card can be presented in several different ways, such as flat, static graphics in plane with the card; flat animation in plane with the card; flat, static graphics raised above the card; flat animation raised above the card; three-dimensional, static graphics coming out of the card; three-dimensional animation coming out of the card; three-dimensional, static graphics projecting into the card; and three-dimensional animation projecting into the card.

DETAILED DESCRIPTION OF THE DRAWINGS

The following descriptions are not meant to limit the invention, but rather to add to the summary of invention, and illustrate the system and method for delivering progressive augmented reality using a series of related media, or ARE tokens, such as collector cards. The system and method presented with the drawings is one potential system and method for implementing progressive augmented reality using a series of ARE tokens, such as a series of collector cards.

Figure 8:
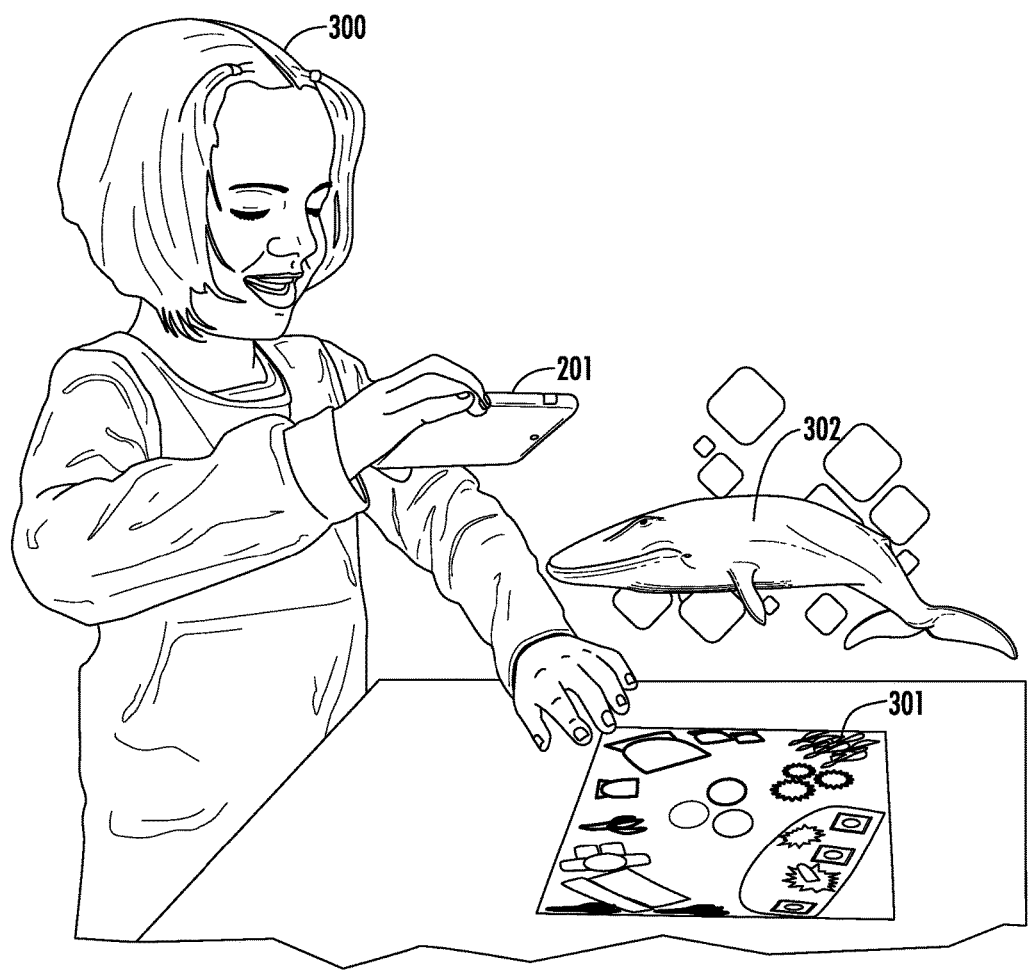
FIG. 8 is an illustration of a user using a first embodiment of the invention.
Figure 9:
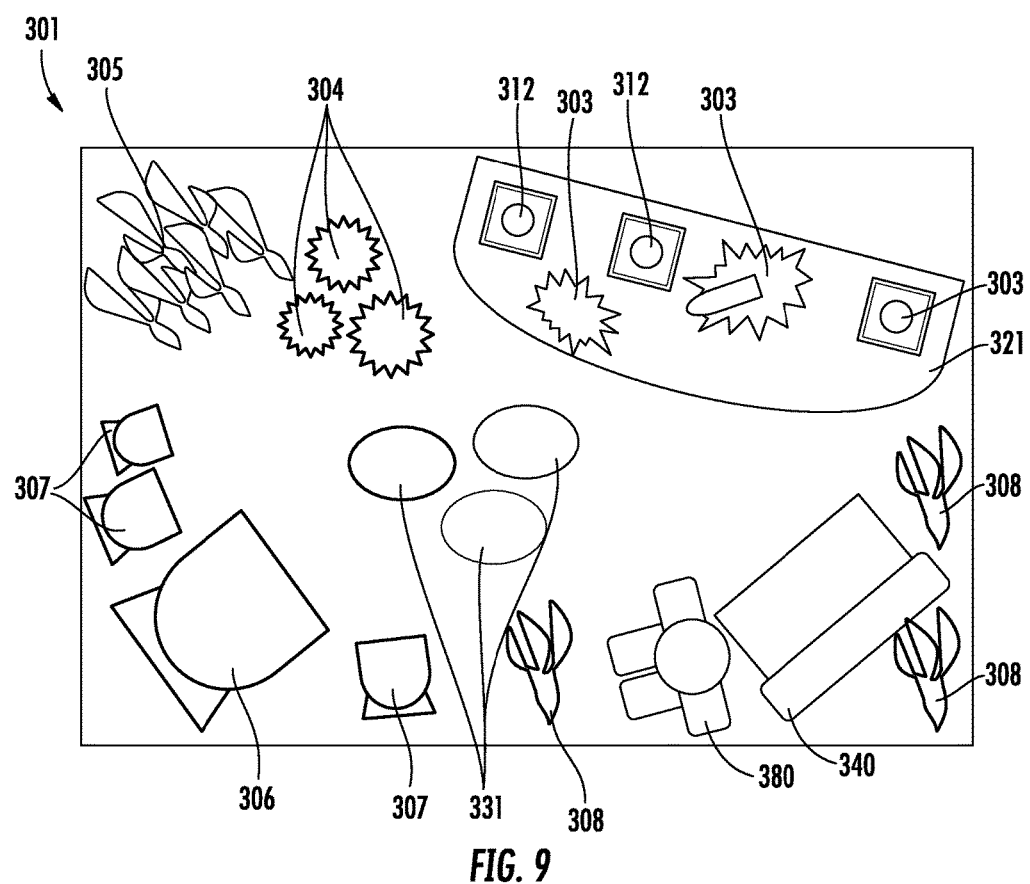
FIG. 9 is an illustration of a first card from a first embodiment of a card series.

FIG. 8 shows a user 300 interacting with an embodiment of an ARE token, a sunken-treasure themed flat collector card 301. The user 300 holds the user electronic appliance 201 through which the user 300 can see an augmented reality presentation 302 super-imposed on the flat collector card 301. FIG. 9 is a close-up of the flat collector card 301. The flat collector card 301 has a plurality of giant clams 306, 307 of various colors, sizes and shapes; a school of fish 305; corral 304; rocks 331; a diver 380; a treasure chest 340; seaweed 308; and a sunken ship 321 with a plurality of cannons 312 and holes 303.

Figure 10:
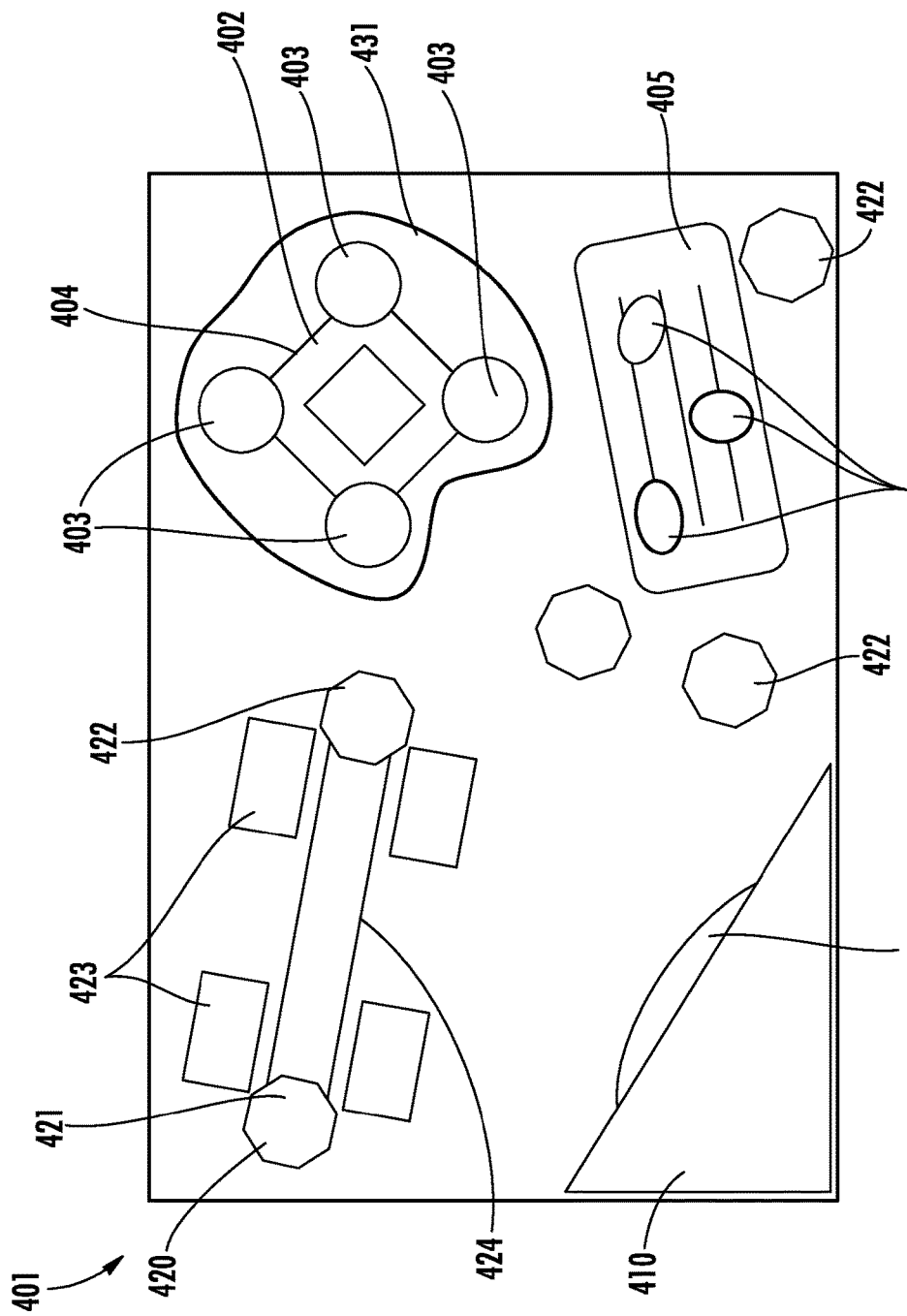
FIG. 10 is an illustration of a first card from a first embodiment of a card series.

FIG. 10 shows a thematically more complex flat collector card 401. The flat collector card 401 is medieval themed, and contains a tournament 420, a castle 404, farmland 405 and a dragon's den 410. The tournament 420 has two jousting knights 422, 421; spectators 423, 422, and an area of combat 424. The castle area 404 has a moat 431; a castle wall 402, and castle towers 403. The dragon's den 410 has a dragon 411 living in it. The farmland 405 has farm fields 405, crops 411, and silos 422.

Figure 11:
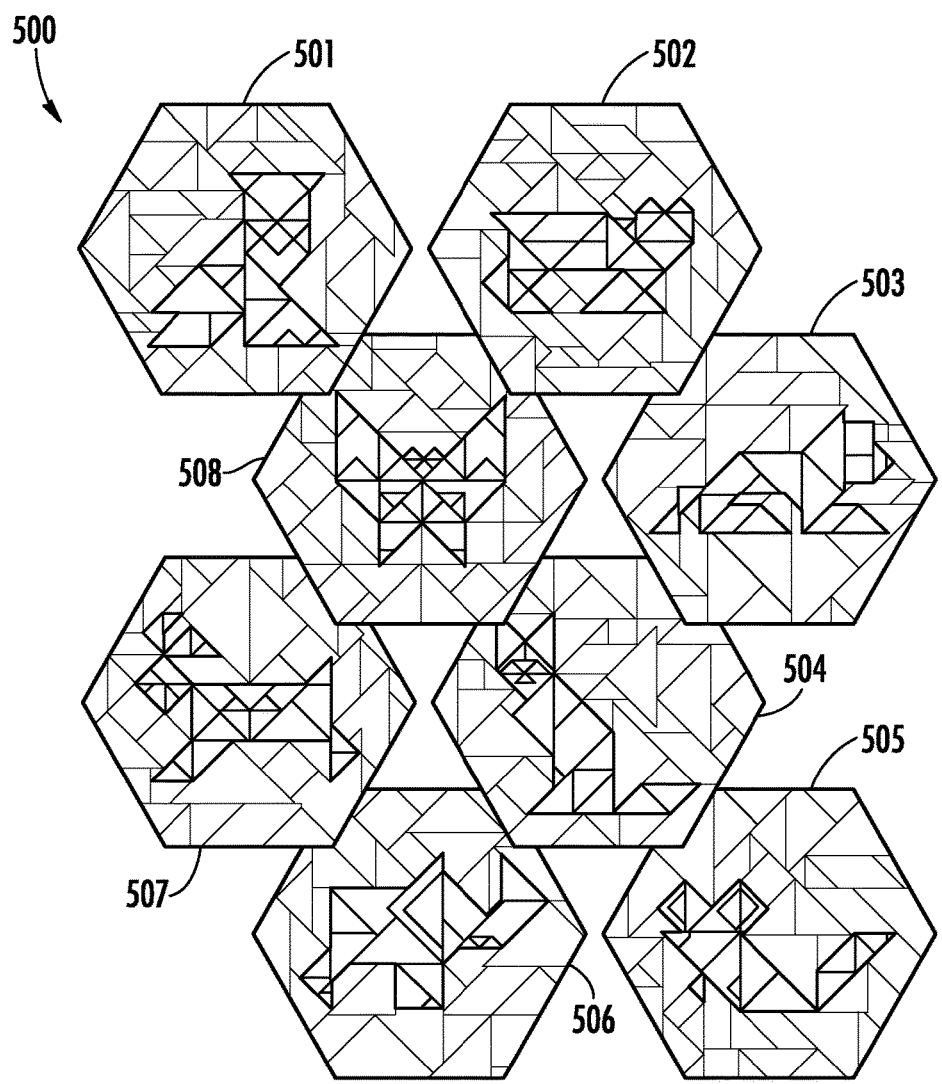
FIG. 11 is an illustration of a second embodiment of a card series.
Figure 12:
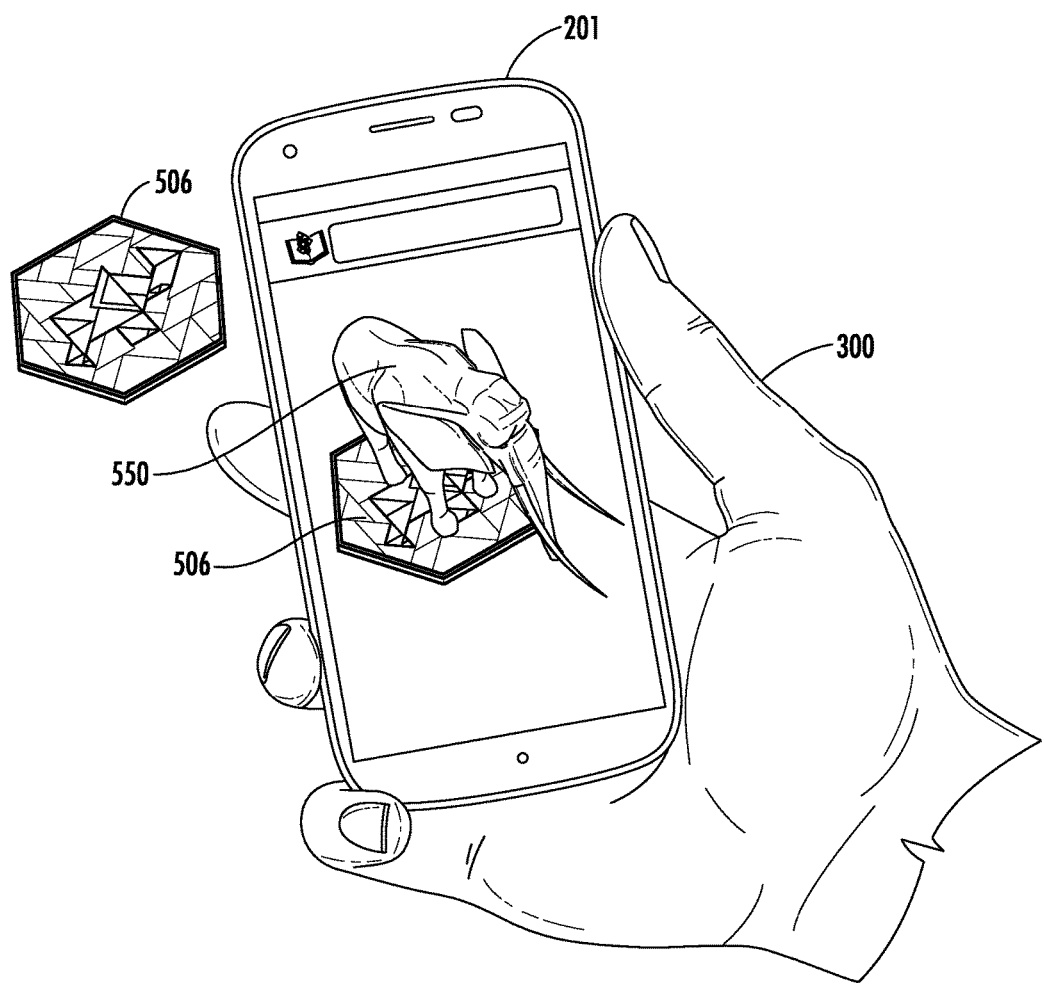
FIG. 12 is an illustration of a user using a second embodiment of the invention.

FIGS. 11-12 show a second embodiment of a series 500 of flat collector cards 501, 502, 503, 504, 505, 506, 507, 508. Each card 501, 502, 503, 504, 505, 506, 507, 508 has a distinct design. When the user 300 aims the user electronic appliance 201 at a card 506, the card 506 and an augmented reality presentation 550 can be seen on the user electronic appliance 201.

FIGS. 1-5 define parallel User Application software processes and Cloud-Based Application processes for use in an augmented reality system for a series of ARE tokens, such as a series collector cards. The embodiment presented, herein, is illustrative, only. Modules, routines, functions, and processes can be implemented as either a User Application, Cloud-Based Application, or a combination of both.

Figure 1:
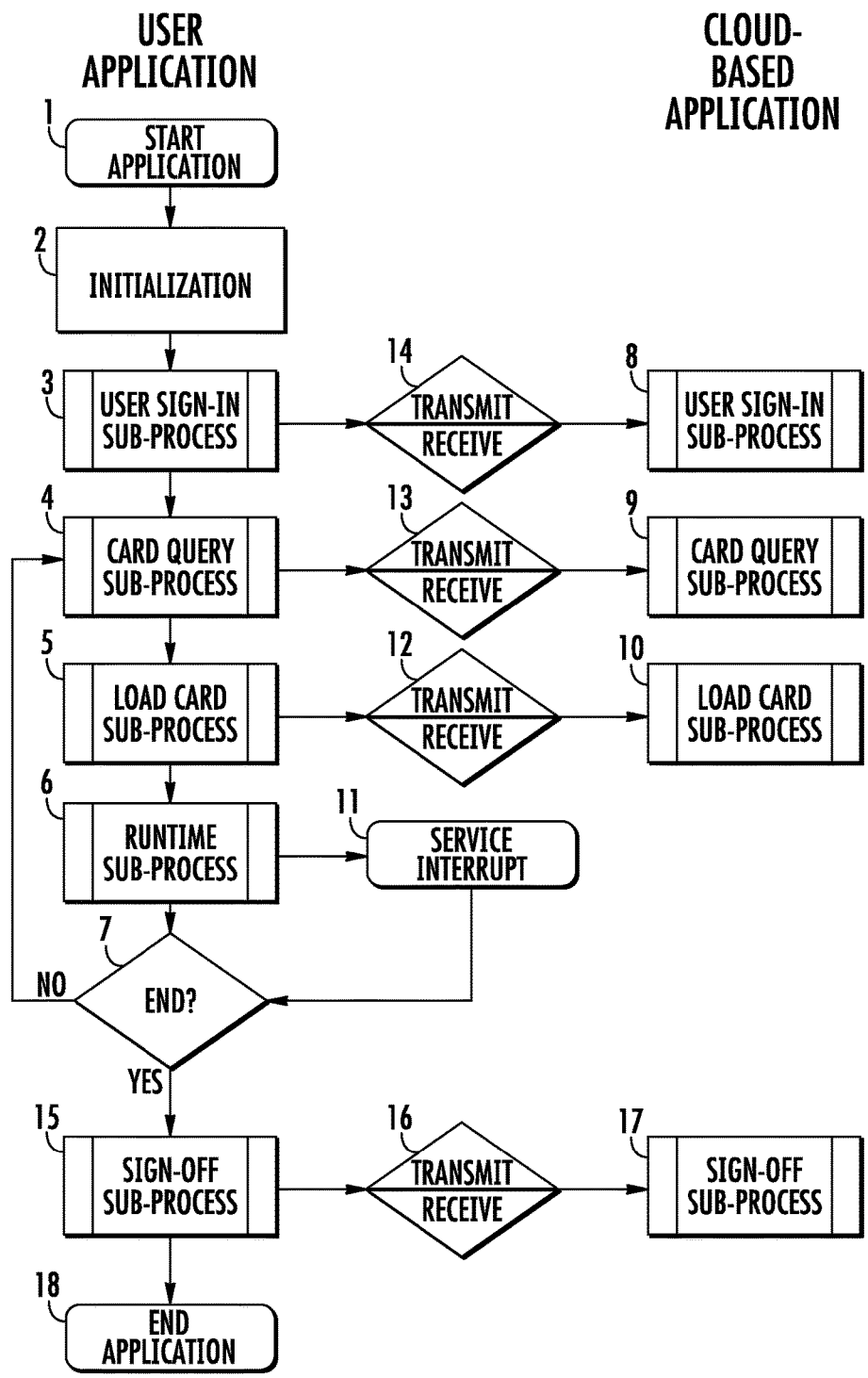
FIG. 1 is a flow chart of a top-level software process.

The User Application and Cloud-Based Application need to perform, at a minimum, four parallel sub-processes: sign-in, card query, card loading, and sign-off. In addition, the User Application needs to perform, at a minimum an additional runtime sub-process. These sub-processes are managed and launched by a top-level process. FIG. 1 shows a flow-chart for the top-level process for delivering augmented reality to a series of collector cards. The user (see, e.g., FIG. 8, 300) starts 1 the user application on the user electronic appliance (see e.g., FIG. 8, 201). The User Application initializes 2, and launches a Sign-In Sub-Process 3.

The User Application Sign-In Sub-Process 3 transmits and receives 14 information to/from a Cloud-Based Application Sign-In Sub-Process 8, which validates the user. The Sign-In Sub-Process 3, 14, 8 is presented in more detail in FIG. 2. After validation or approval is received from the Sign-In Sub-Process 3, 14, 8, the User Application launches a Card Query Sub-Process 4. The User Application Card Query Sub-Process 4 transmits and receives 13 information to/from a Cloud-Based Application Card Query Sub-Process 9. The Card Query Sub-Process 4, 13, 9 is presented in more detail in FIG. 3.

After the Card Query 4, 13, 9 confirms that a card is available for augmented reality, the User Application launches a Load Cards Sub-Process 5. The User Application Load Cards Sub-Process 5 transmits and receives 12 information to/from a Cloud-Based Application Load-Cards Sub-Process 10. The user 300 uses a user electronic appliance 201 to capture an image of one or more cards (see e.g., FIG. 9, 301; FIG. 10; 401, FIG. 11; 501, 502, 503, 504, 505, 506, 507, 508). The image of a card is associated with a card unique visual identifier for that card. The information received from the Cloud-Based Application Load-Cards Sub-Process 10 is the record associated with each card in the User's 300 library that is in the series corresponding to the card unique visual identifier. Each card in the series has a corresponding augmented reality record that contains a multi-media presentation associated with that particular card. Additionally, if the user 300 has multiple cards in the same series (e.g., 501, 502, 503, 504, 505, 506, 507, 508), additional augmented reality presentations are stored as separate records, allowing for the interaction between cards (e.g., 501 and 502). The Load Cards Sub-Process 5, 12, 10, is presented in more detail in FIG. 4.

After the Load Cards Sub-Process 5, 12, 10 loads augmented reality information associated with one or more cards, the User Application launches a Runtime Sub-Process 6. The User Application can proceed independently of the Cloud-Based Application while executing the Runtime Sub-Process 6. The User Application Runtime Sub-Process 6 presents the user 300 with augmented reality associated with one or more cards (e.g., 501, 502, 503, 504, 505, 506, 507, 508) in a series of collector cards, using the record stored in a database, which is associated with a unique visual identifiers corresponding to the cards in the user's 300 library. The augmented reality multi-media presentation can be graphics, animation, sound, haptics, or other multimedia presented to the user electronic appliance 201. The Runtime Sub-Process is enabled with a Service Interrupt 11, which allows the User 300 to stop the augmented reality multimedia presentation. The Service Interrupt 11 can be implemented with a soft-key, hard-key, touch-screen, voice command, or haptic control.

Either when the Service Interrupt 11 is activated or the Runtime Sub-Process 6 terminates, the User 300 is presented with a choice to either end the session or continue with a new cards within the same series or to change to a different series of collector cards, through the use of a User Termination Control 7. The User Termination Control 7 can be implemented with a soft-key, hard-key, touch-screen, voice command, or haptic control.

When the User 300 terminates a session, either through action or inaction, the User Application launches a Sign-Off Sub-Process 15. The User Application Sign-Off Sub-Process 15 transmits and receives 16 to/from a Cloud-Based Application Sign-Off Sub-Process. The Sign-Off Sub-Process 15, 16, 17 ends the User's 300 session and stores any user-created content or new collector cards in the User's 300 library 419. This ends 8 the main process.

Figure 2:
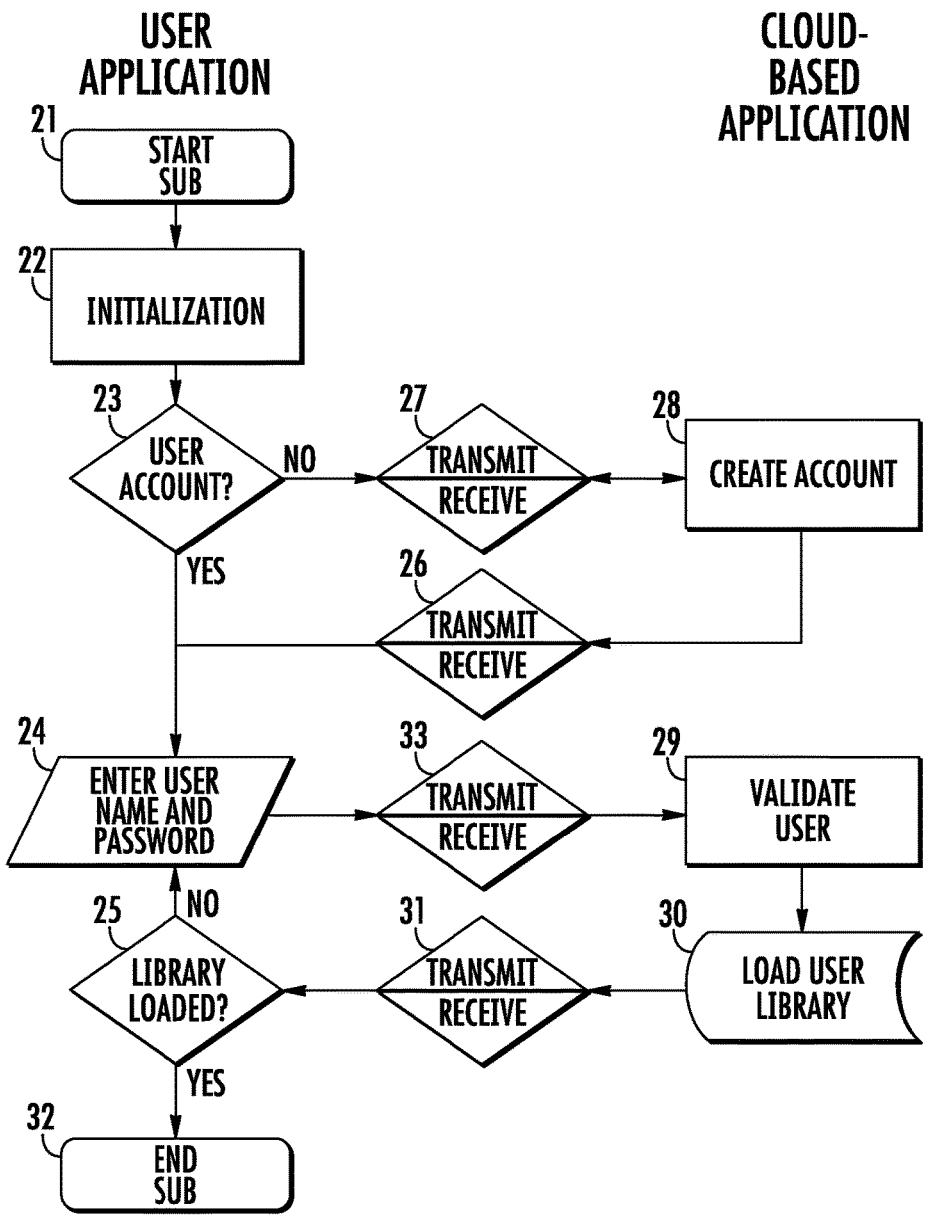
FIG. 2 is a high level flowchart of a user validation sub-process.

FIG. 2 is a high-level flowchart of the Sign-In Sub-Process 3, 14, 8 discussed pursuant to FIG. 1. The sub-process starts 21 and is initialized 22, passing any necessary variables. The user 300 (or, realistically, the user's 300 parent) is given a choice to create a new account 23 or enter the user's 300 name and password 24. The information is transmitted 26, 27, 33 to the Cloud-Based Application, where it serves as the input to the appropriate function, either Create Account 28 or Validate User 29. If the User 300 creates a new account 23, 27, 28, the Cloud-Based Application transmits 26 a prompt to the User Application to ask the User 300 to enter their name and password 24, after creating a new account 28. If the User 300 provides the correct user name and password 24, which is transmitted 33 to the Cloud-Based Application, the Validate User 29 function will Load User Library 30. Load User Library 30 then transmits 31 icons and metadata representing the cards in the series (e.g., 501, 502, 503, 504, 505, 506, 507, 508) to the User Application. The User Application knows to end the sub-process when the library of card icons and metadata is loaded 25, 32.

Figure 3:
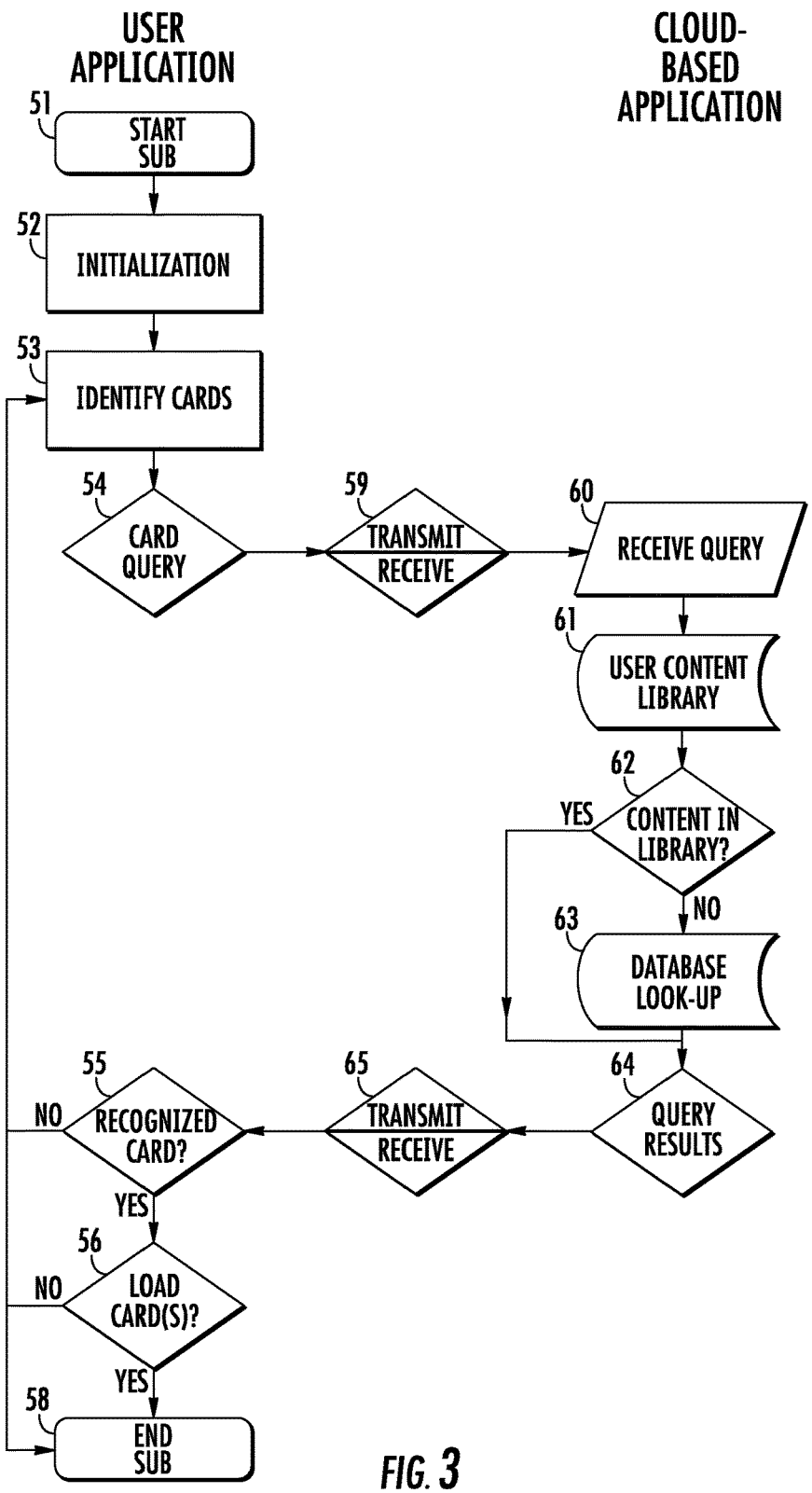
FIG. 3 is a high level flowchart of a card identification sub-process.

FIG. 3 is a high-level flowchart of the Card Query Sub-Process 4, 13, 9 discussed in FIG. 1. The sub-process starts 51 and is initialized 52, passing any necessary variables or information. The user 300 gives the User Application input to Identify Cards 53, including, but not limited to, the following: typing in a card identifier, using an image of the card; selecting a card icon from the user's 300 library; sensing an RFID or other near-field chip embedded in the card; sensing magnetic ink or strip on the card; or sensing infra-red or ultra-violet ink printed on the card. The User Application identifies the Card Query 54 and transmits and receives 59 information from the Cloud-Based Application, which Receives Query 65. The Cloud-Based Application determines if the card is already in the User Library 61, 62. If the card is already available in the User Library 61, this result is loaded as the Query Results 64. If the card is not present in the User Library 61, the sub-process performs a Database Look-up 63 to determine if the card is available for augmented reality treatment, and loads this as the Query Results 64. The Query Results 64 is transmitted 65 to the User Application, which uses the Query Results 64 to determine if the Card is Available 55. If the Card is Available 55, the User 300 is asked if they want to Load Card 56. If the User 300 wants to Load Card 56, the result is passed as the value from the sub-process, and the sub-process ends 58. If the User 300 does not want to load the card 56, or if the card is not available 55, the User 300 can search another card 53 or end the process 58.

Figure 4:
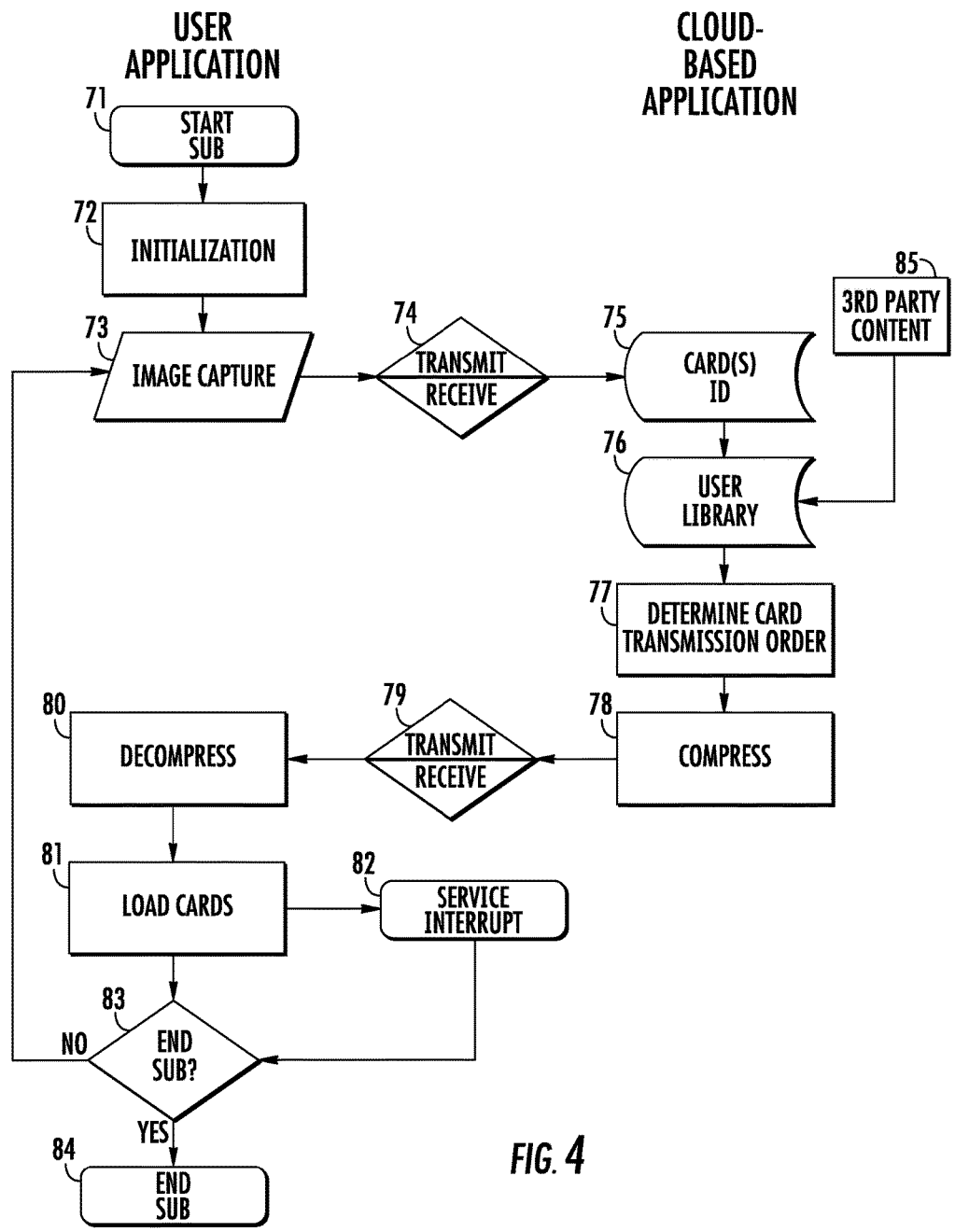
FIG. 4 is a high level flowchart of a card loading sub-process.

FIG. 4 shows the Load Cards Sub-Process 5, 12, 10. The sub-process starts 71 and initializes 72 with positive query results 56 from the Card Query Sub-Process 4, 13, 9. The User 300 prompts the User Application to proceed by capturing an image 73 of one or more cards using the user electronic appliance 201. This image is transmitted 74 to the Cloud-Based Application, which searches the database for a Card(s) ID 75. Each card is associated with a unique visual identifier. The unique visual identifier is associated with a Card ID 75. Each Card ID 75 in a user's library 76 is associated with a record. The record contains a unique augmented reality presentation comprised of a presentation associated with the Card ID 75, $3^{rd}$ party content 85, and any user created content 61 in the user library 76. The user 300 can create user content 61 or purchase additional $3^{rd}$ party content 85 to supplement their augmented reality presentation. Additionally, the user 300 can add an avatar to represent themselves as part of the user created content 61 library. Additionally, each permutation or combination of Card IDs 75 is also associated with additional augmented reality content, allowing the user 300 to see special content when cards 501, 502, 503, 504, 505, 506, 507, 508 in a series 500 are combined.

The augmented reality is supplemented with information from the User Library 76. The Cloud-Based Application will Determine Card Transmission Order 77 based off of the card from the Image Capture 73 and from the User Library 76. The information will be compressed 78 and transmitted 79 to the user electronic appliance 201, where it will be decompressed 80 by the user application. The cards will be loaded 81 in a process with a Service Interrupt 82. If the Service Interrupt 82 stops the Load Cards 81 routine, the user Application will allow the user 300 to end the sub-process 83,84, or go back to Image Capture 73. If Load Cards 81 successfully loads the augmented reality record associated with the card(s) 501, 502, 503, 504, 505, 506, 507, 508, the Sub-Process will end successfully 83, 84.

Figure 5:
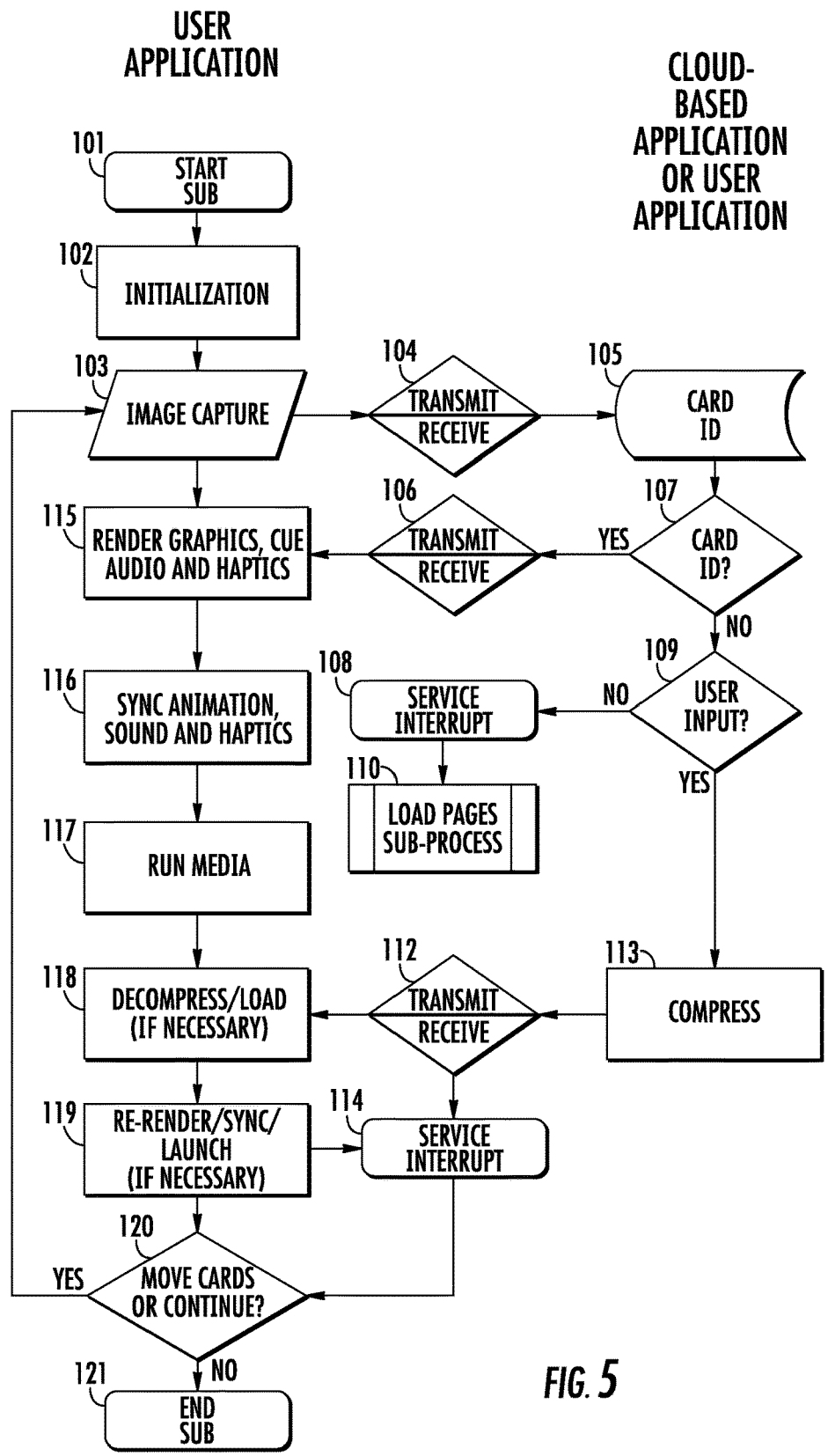
FIG. 5 is a high level flowchart of a runtime sub-process.

FIG. 5 shows the Runtime Sub-Process 6, which has a Service Interrupt 11, 108, 114. In FIG. 5, the Runtime Sub-Process 6 starts 101 and is initialized 102. The Image Capture 103 has augmented reality super-imposed on it by the User Application. This is done by Rendering Graphics, Cue Audio and Haptics 115. The User Application Syncs Animation, Sound and Haptics 116, and then Runs Media 117. The User Application can begin Runs Media 117, prior to all layers of graphics being rendered. So although Rendering Graphics, Cue Audio and Haptics 115, Syncs Animation, Sound and Haptics 116, and Runs Media 117 are shown as sequential processes, they can be launched and executed as a partial parallel process. While the augmented reality multi-media presentation on the user electronic appliance 201 Renders 115, Syncs 116, and Runs 117, the user application transmits 104 the Image Capture 103 to the Cloud-Based Application. The Card ID 105 is confirmed 107, 106, prior to Rendering Graphics 115. If the Image Capture 103 does not match the Card ID 105, 107 the Cloud-Based Application determines if the difference is from User Input 109. If it is, the User Input 109 is Compressed 113 and transmitted 110. The user application then Decompress/Loads 118 and Re-renders/Sync/Launch 119. At the end of the runtime, the User Application prompts the User 300 to Move Cards or Continue 120. Moving Cards 120 can include adding cards, changing the orientation of cards 501, 502, 503, 504, 505, 506, 507, 508, removing cards 501, 502, 503, 504, 505, 506, 507, 508 from the array, or all of the foregoing. If the User 120 decides to end, the Sub-Process Ends 121.

During the Runtime Sub-Process, if the Cards ID 107 is not confirmed, and the difference is not User Input 109, the Cloud-Based Application sends a Service Interrupt 108 to the user application, and the user application re-enters the Load Cards Sub-Process 108, 5, 12, 10 or is given a choice to continue in the Runtime Sub-Process 108, 114, 120.

Figure 6:
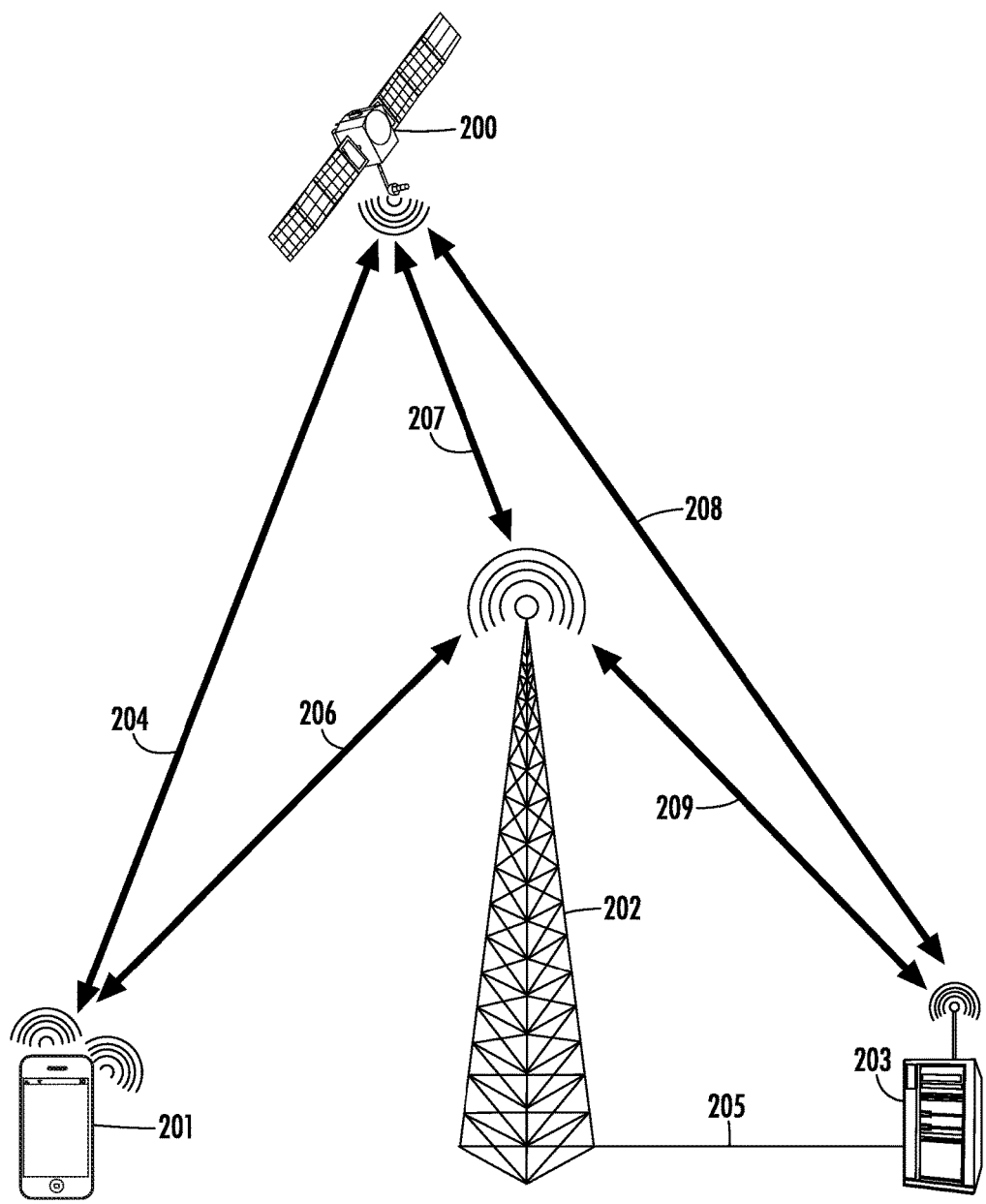
FIG. 6 is a system communication diagram.

FIG. 6 shows multiple communication paths between the user electronic appliance 201, containing the User Application, and the server 203 containing the Cloud-Based Application and augmented reality records from FIGS. 1-5. The user electronic appliance 201 can communicate 204 with a satellite 200, which in turn communicates 207 with a cell network tower 202 which can then wirelessly communicate 209 with the server 203, or can communicate 205 through the internet or other tangible connection to the server 203. The satellite 200 can also communicate directly with the server 203, if so enabled. This is meant to be illustrative in the communication methods that could connect the user electronic appliance 201, containing the User Application, to the server 203, containing the Cloud-Based Application, and is not meant to suggest that this is an exhaustive set of the communication links between the user electronic appliance 201 and the server 203.

Figure 7:
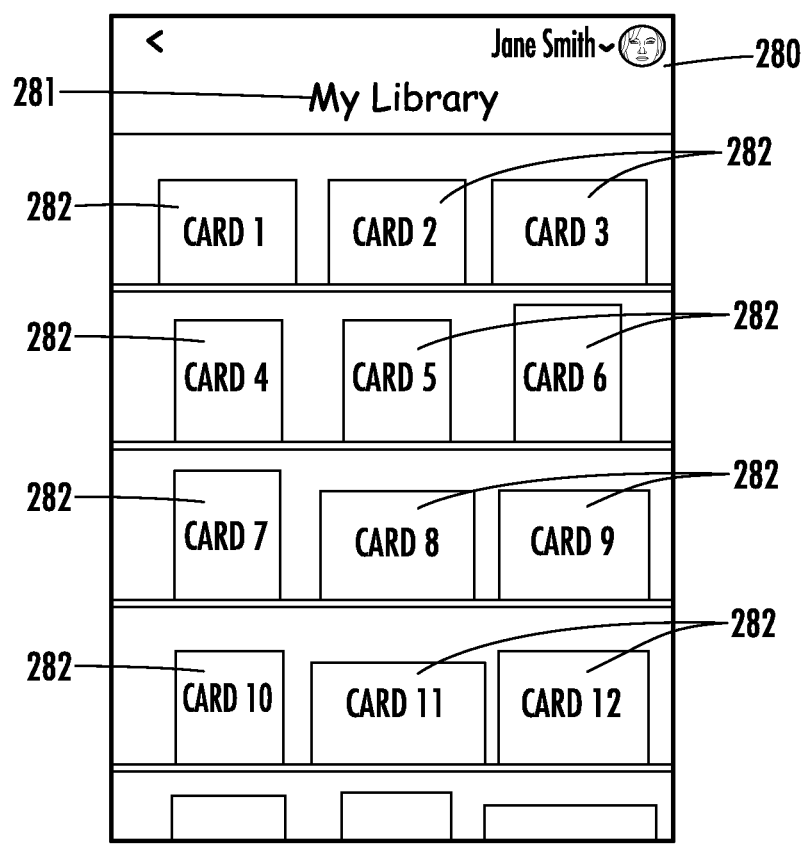
FIG. 7 is a display showing a user's card library.

FIG. 7 shows a screen of the user library 281. The actual user name or avatar 280 can be used to identify the owner of the library 281. The library lists the plurality of cards 282 that the user 300, 280 has in their library 282.

Figure 13:
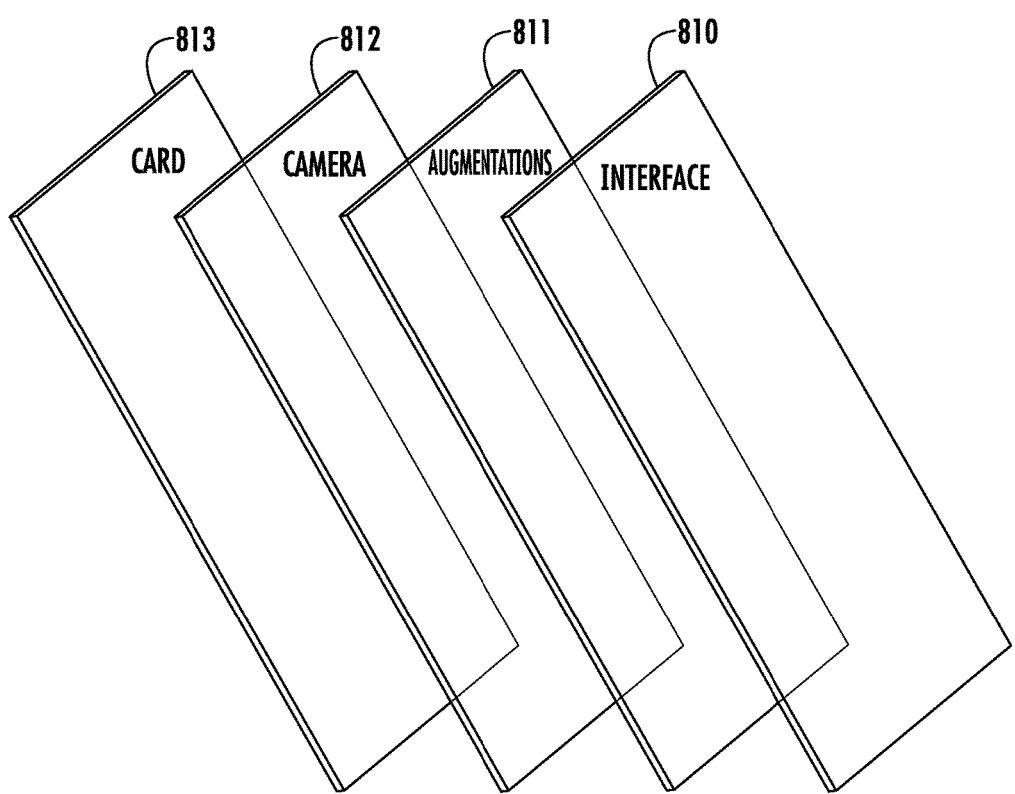
FIG. 13 is a diagram showing the presentation layers of the invention when using cards as the related media.

FIG. 13 shows the various graphic layers used in this invention. The card layer 813, camera layer 812, augmentations layer 811, and interface layers can all be rendered 115 separately.

Referring to FIGS. 8-10, the user 300 can trigger new augmented reality presentations through her 300 actions, including shaking the user electronic appliance 201 or moving the collector card 301. Other triggers that would result in new augmented reality presentations being loaded include the user 300 verbally saying or identifying some of the shapes or images on the flat collector card 301. The user 300 can interact with the augmented reality display by calling out items on the flat collector card 301 such as giant clams 306, 307; school of fish 305; corral 304; rocks 331; diver 380; treasure chest 340; seaweed 308; and sunken ship 321. By calling out any of these items, the item can be animated, or a special augmented reality presentation associated with that item (e.g., 306, 307, 305, 304, 331, 380, 340, 308. and 321) can be launched. Additionally, the user 300 can interact with the augmented reality by clapping, whistling, blowing, moving the flat collector card 301, adding additional cards 400, and moving the user electronic appliance 201. User 300 context can also act as a trigger. For example, inaction, switching the user electronic appliance 201 between two cards 301, 401, repetitive card 301, 401 flipping, and random card 301, 401 flipping can also be used as triggers.

Referring to FIGS. 11-12, the cards 501, 502, 503, 504, 505, 506, 507, 508 can interact with one another, offering supplemental augmented reality for the user 300. This series 500 of flat collector cards represents many different kinds of animals: owls 501; snake 502; dog 503; cat 504; mouse 505; elephant 506; goat 507; butterfly 508. Each permutation would create a different interaction. For example, with the elephant 506 and mouse 505, the mouse chases the elephant. When the cat 504 is added, the cat 504 chases the mouse 505 and the elephant 506 is a spectator. By allowing different interactions depending on the permutation of the cards 501, 502, 503, 504, 505, 506, 507, 508, the user 300 can create many different augmented reality scenarios.

I claim:

1. A system to provide multi-media augmented reality content for serialized augmented-reality enabled ("ARE") tokens comprising a user electronic appliance, the user electronic appliance being comprised of a display, image capture device, a software application, embodied on a non-transitory computer readable medium, and a transmission means;
   a server processing device connected to the user electronic appliance via the transmission means;
   a database connected to the server processing device;
   and a software method, embodied on a non-transitory computer readable medium, accessible to the server processing device, capable of identifying a unique ARE token, from a series of ARE tokens, by a unique visual identifier, associating the unique visual identifier with a unique augmented reality record containing an embedded multi-media presentation, referred to as multi-media augmented reality content, stored in the database, and capable of transmitting the augmented reality record, via the transmission means, to the user electronic appliance;
   wherein the software application resident on the user electronic appliance can run the multi-media augmented reality content on the display of the user electronic appliance, superimposing the multi-media augmented reality content over a real-time image of the ARE token associated with the augmented reality record by the unique visual identifier; and
   wherein the multi-media augmented reality content associated with the ARE token can interact with the multi-media augmented reality content associated with other ARE tokens in the series.

2. The system to provide multi-media augmented reality content for serialized ARE tokens in claim 1, wherein the multi-media augmented reality content is comprised of, at least, one visual components and one audio component, that are time-synchronized.

3. The system to provide multi-media augmented reality content for serialized ARE tokens in claim 2, wherein the multi-media augmented reality content associated with the ARE token can be supplemented by user-created content.

4. The system to provide multi-media augmented reality content for serialized ARE tokens in claim 3, wherein the supplemented user-created can include a user-created graphical character, called an avatar.

5. The system to provide multi-media augmented reality content for serialized ARE tokens in claim 4, wherein the avatar can be animated.

6. The system to provide multi-media augmented reality content for serialized ARE tokens in claim 5, wherein the user-created content can interact, and be time synchronized, with the multi-media augmented reality content associated with the ARE token.

7. The system to provide multi-media augmented reality content for serialized ARE tokens in claim 2, wherein the visual component of the multi-media augmented reality content is at least one of the following: flat, static graphics in plane with the ARE token; flat animation in plane with the ARE token; flat, static graphics raised above the ARE token; flat animation raised above the ARE token; three-dimensional, static graphics coming out of the ARE token; three-dimensional animation coming out of the ARE token; three-dimensional, static graphics projecting into the ARE token; and three-dimensional animation projecting into the ARE token.

8. The system to provide multi-media augmented reality content for serialized ARE tokens in claim 7, wherein placing two or more ARE tokens from the same series in proximity to one another, so that the image capture device on the user electronic appliance can capture the two or more ARE tokens, simultaneously, causes the multi-media augmented reality content associated with each of the two or more ARE tokens to simultaneously activate and time-synchronize.

9. The system to provide multi-media augmented reality content for serialized ARE tokens in claim 8, wherein the multi-media augmented reality content from the two or more ARE tokens interact with one another.

10. The system to provide multi-media augmented reality content for serialized ARE tokens in claim 9, wherein the two or more ARE tokens represent a unique combination of ARE tokens from the series of ARE tokens.

11. The system to provide multi-media augmented reality content for serialized ARE tokens in claim 10, wherein additional multi-media augmented reality content is contained in a separate record associated with each unique combination of ARE tokens from the series of ARE tokens.

12. The system to provide multi-media augmented reality content for serialized ARE tokens in claim 11, wherein the additional multi-media augmented reality content associated with the unique combination of ARE tokens is presented to the user, along with the multi-media augmented reality content associated with each individual ARE token in the combination.

13. The system to provide multi-media augmented reality content for serialized ARE tokens in claim 12, wherein the additional multi-media augmented reality content associated with the unique combination of ARE tokens and the multi-media augmented reality content associated with each individual ARE token in the combination can interact and interoperate with one another.

14. The system to provide multi-media augmented reality content for serialized ARE tokens in claim 13, wherein the additional multi-media augmented reality content associated with the unique combination of ARE tokens and the multi-media augmented reality content associated with each individual ARE token in the combination can be simultaneously triggered.

15. The system to provide multi-media augmented reality content for serialized ARE tokens in claim 14, wherein the triggering can be manual or automatic.

16. The system to provide multi-media augmented reality content for serialized ARE tokens in claim 15, wherein automatic triggering occurs based on elapsed time.

17. The system to provide multi-media augmented reality content for serialized ARE tokens in claim 16 wherein manual triggering is accomplished by performing at least one of the following: shaking the user electronic appliance; moving the ARE token; verbally saying or identifying some of the shapes or images on the ARE token; clapping; whistling; blowing; and adding additional ARE tokens.

18. The system to provide multi-media augmented reality content for serialized ARE tokens in claim 3, wherein the serialized ARE tokens are a series of collector cards.

19. A method to provide multi-media augmented reality content for serialized augmented-reality enabled ("ARE") tokens comprising using an electronic appliance, wherein the electronic appliance has, at least, a display, an image capture device, a software application, embodied on a non-transitory computer readable medium, and a transmission means;
   wherein the software application resident on the electronic appliance can communicate with a software method, embodied on a non-transitory computer readable medium, on a remote server;
   wherein the software application resident on the remote server is capable of identifying a unique ARE token, from a series of ARE tokens, by a unique visual identifier, associating the unique visual identifier with a unique augmented reality record, accessible to the remote server, containing an embedded multi-media presentation, referred to as multi-media augmented reality content;
   wherein the software application resident on the electronic appliance and the software application resident on the remote server are capable of interacting and transmitting the augmented reality record, via the transmission means, to the user electronic appliance;
   wherein the software application resident on the user electronic appliance can run the multi-media augmented reality content on the display of the user electronic appliance, superimposing the multi-media augmented reality content over a real-time image of the ARE token associated with the augmented reality record by the unique visual identifier; and
   wherein the multi-media augmented reality content associated with the ARE token can interact with the multi-media augmented reality content associated with other ARE tokens in the series.

20. The method to provide multi-media augmented reality content for serialized ARE tokens in claim 19, wherein the multi-media augmented reality content is comprised of, at least, one visual components and one audio component, that are time-synchronized.

21. The method to provide multi-media augmented reality content for serialized ARE tokens in claim 20, wherein the multi-media augmented reality content associated with the ARE token can be supplemented by user-created content.

22. The method to provide multi-media augmented reality content for serialized ARE tokens in claim 21, wherein the supplemented user-created can include a user-created graphical character, called an avatar.

23. The method to provide multi-media augmented reality content for serialized ARE tokens in claim 22, wherein the avatar can be animated.

24. The method to provide multi-media augmented reality content for serialized ARE tokens in claim 23, wherein the user-created content can interact, and be time synchronized, with the multi-media augmented reality content associated with the ARE token.

25. The method to provide multi-media augmented reality content for serialized ARE tokens in claim 20, wherein the visual component of the multi-media augmented reality content is at least one of the following: flat, static graphics in plane with the ARE token; flat animation in plane with the ARE token; flat, static graphics raised above the ARE token; flat animation raised above the ARE token; three-dimensional, static graphics coming out of the ARE token; three-dimensional animation coming out of the ARE token; three-dimensional, static graphics projecting into the ARE token; and three-dimensional animation projecting into the ARE token.

26. The method to provide multi-media augmented reality content for serialized ARE tokens in claim 25, wherein placing two or more ARE tokens from the same series in proximity to one another, so that the image capture device on the user electronic appliance can capture the two or more ARE tokens, simultaneously, causes the multi-media augmented reality content associated with each of the two or more ARE tokens to simultaneously activate and time-synchronize.

27. The method to provide multi-media augmented reality content for serialized ARE tokens in claim 26, wherein the multi-media augmented reality content from the two or more ARE tokens interact with one another.

28. The method to provide multi-media augmented reality content for serialized ARE tokens in claim 27, wherein the two or more ARE tokens represent a unique combination of ARE tokens from the series of ARE tokens.

29. The method to provide multi-media augmented reality content for serialized ARE tokens in claim 28, wherein additional multi-media augmented reality content is contained in a separate record associated with each unique combination of ARE tokens from the series of ARE tokens.

30. The method to provide multi-media augmented reality content for serialized ARE tokens in claim 29, wherein the additional multi-media augmented reality content associated with the unique combination of ARE tokens is presented to the user, along with the multi-media augmented reality content associated with each individual ARE token in the combination.

31. The method to provide multi-media augmented reality content for serialized ARE tokens in claim 30, wherein the additional multi-media augmented reality content associated with the unique combination of ARE tokens and the multi-media augmented reality content associated with each individual ARE token in the combination can interact and interoperate with one another.

32. The method to provide multi-media augmented reality content for serialized ARE tokens in claim 31, wherein the additional multi-media augmented reality content associated with the unique combination of ARE tokens and the multi-media augmented reality content associated with each individual ARE token in the combination can be simultaneously triggered.

33. The method to provide multi-media augmented reality content for serialized ARE tokens in claim 32, wherein the triggering can be manual or automatic.

34. The method to provide multi-media augmented reality content for serialized ARE tokens in claim 33, wherein automatic triggering occurs based on elapsed time.

35. The method to provide multi-media augmented reality content for serialized ARE tokens in claim 34 wherein manual triggering is accomplished by performing at least one of the following: shaking the user electronic appliance; moving the ARE token; verbally saying or identifying some of the shapes or images on the ARE token; clapping; whistling; blowing; and adding additional ARE tokens.

36. The method to provide multi-media augmented reality content for serialized ARE tokens in claim 21, wherein the serialized ARE tokens are a series of collector cards.

\* \* \* \* \*